UNITED STATES PATENT OFFICE.

CHARLES CATLETT, OF STAUNTON, VIRGINIA.

OXYSALT COMPOSITION AND PROCESS OF MAKING THE SAME.

1,282,188.  Specification of Letters Patent.  Patented Oct. 22, 1918.

No Drawing.  Application filed May 9, 1918.  Serial No. 233,564.

*To all whom it may concern:*

Be it known that I, CHARLES CATLETT, a citizen of the United States, residing at Staunton, in the county of Augusta and State of Virginia, have invented certain new and useful Improvements in Oxysalt Compositions and Processes of Making the Same; and I do hereby declare the following to be a full, clear, and exact description of the invention, such as will enable others skilled in the art to which it appertains to make and use the same.

This invention relates to oxysalt compositions and processes of making the same; and it also relates to methods of treating other materials with said oxysalt compositions, and the products resulting from said treatment.

In certain industrial operations it is sometimes desirable to employ substances which, as such, are difficult to handle on account of their tendency to absorb water or deliquesce rapidly. This is notably so in the case of calcium chlorid, for example, a substance which can be usefully employed in various connections but the use of which is difficult and often impracticable by reason of its characteristic property of taking up moisture with extreme rapidity. It is also desirable in certain operations to treat materials such as concrete mixtures and the like with a salt, especially a salt of an alkaline earth metal, and with a hydrate of such metal, simultaneously. It is a principal object of this invention to provide compositions of matter which will enable operations of the general character described to be carried out conveniently and efficiently and without the difficulties which have heretofore been unavoidable. Other objects of the invention will appear as the disclosure proceeds.

More particularly, the invention relates to the preparation of novel compositions of matter containing set oxysalt cement compounds as characteristic constituents in relatively large proportions, especially such compounds as oxychlorids of calcium, magnesium, etc. The invention contemplates in particular compositions of this character which can be prepared and kept in finely divided or pulverized form, but which upon treatment with excess of moisture will break down rather readily, yielding a metallic salt, such as a chlorid, and also a hydrate or hydroxid, or at any rate conducting itself in a manner indicating such action. Compositions of this character can be used in novel ways to produce novel products; and these methods and products are also contemplated by the invention.

One of the most important specific applications of the invention is the preparation of a pulverulent composition consisting of or comprising an oxychlorid of calcium; and the preparation of such a composition, as well as various methods of using the same, together with the novel products resulting therefrom, will be hereinafter set forth in detail. It is to be understood, however, that this detailed description illustrates a typical example only, and is for the purpose of affording a clear disclosure and explanation of one particularly desirable form which the broad invention may take.

In and of itself, calcium oxychlorid is not a new product. Prior patents and publications disclose methods of preparing cementitious materials in which an oxychlorid of calcium is or may be formed either as the primary object of the method disclosed, or incidentally thereto. Speaking generally, the production of oxychlorid and other oxysalt cements, such as oxychlorids, oxysulfates, oxyphosphates, etc., of calcium, magnesium, zinc, etc., is of course well known in the art. In prior methods, however, the primary object has been to produce an "insoluble" and resistant product valuable for its cementing properties. In the case of calcium oxysalts, especially the oxychlorid, this object has not been attained with any degree of practical success owing to the fact that calcium oxychlorid is less stable and resistant than magnesium or zinc oxychlorid, for example, being relatively "soluble" and decomposable by excess of water. Hence calcium oxychlorid has been considered a worthless material and no practical use has heretofore been made of it, so far as I am aware, nor has it been prepared in pulverulent form. In referring to calcium oxychlorid, it is not to be understood that a compound of fixed or invariable formula is meant. Oxychlorid of calcium may vary considerably in constitution, and especially as regards water of combination or crystallization, depending upon the conditions under which it is formed, the character and proportions of the reacting materials from which it is derived, and other factors. The term is here used broadly to designate any of the products commonly resulting from the reaction between lime and calcium chlorid in the presence of water. A similar meaning is to be understood as intended by reference herein to oxychlorids or oxysalts generally of other metals.

In contrast to the prior art above mentioned, the present invention does not aim primarily at the preparation of a material which in itself has cementitious properties. On the contrary, a certain degree of instability or readiness to decompose upon treatment with an excess of water or other form of moisture is a desirable characteristic of the composition which it is a primary object of this invention to provide. Such behavior is of course directly the reverse of that desirable where the problem is that of preparing a stable and resistant cement, which is the problem usually sought to be solved by those working with oxychlorid or other oxysalt compositions.

Briefly described, the process of preparing what may be termed the primary or main product contemplated by the invention comprises reacting between a suitable base and a suitable salt in the presence of moisture and under such conditions as to form an oxysalt cement compound, the proportions of the reacting substances and the conditions of operation being such that the reaction mixture or mass develops a distinct set and becomes more or less hard and coherent, then allowing the mass to dry out to the desired extent, or artificially drying it, and finally reducing the substantially dry set cement product to finely divided condition, as by grinding, crushing, or otherwise pulverizing it. The resultant material need not, and it ordinarily does not, exhibit marked cementitious properties upon mixing with water. But decomposability with excess of water to some extent, and most desirably in high degree, characterizes material prepared in accordance with the invention.

For the purposes of the present invention, a composition consisting of calcium oxychlorid, or containing calcium oxychlorid in relatively large proportion, has special advantages. Such a composition may be prepared in pulverized form and kept in this form for relatively long periods of time without material change or deterioration, while at the same time treatment of the pulverized material with water in excess results in rapid decomposition of the oxychlorid with concomitant production of calcium chlorid and calcium hydrate or hydroxid in immediately available form. Such a product therefore enables material very high in available calcium chlorid to be stored and handled without involving in any way the difficulties and annoyances incident to storing and handling calcium chlorid. Furthermore, the simultaneous production of both calcium hydroxid and calcium chlorid upon treatment of the oxychlorid composition with water is of great advantage in the treatment of certain cement and concrete mixtures, where I have found the simultaneous addition of calcium chlorid and calcium hydroxid to produce highly desirable novel results.

The foregoing considerations apply also in some degree to the production of pulverized compositions consisting of or comprising magnesium oxychlorid, zinc oxychlorid, etc., and to other oxysalts of such bases. But for the purposes of the present invention, a composition consisting of calcium oxychlorid or containing calcium oxychlorid in preponderating proportion is especially desirable on account of the greater ease with which calcium oxychlorid breaks down upon treatment with water in excess, as compared to other oxysalt compounds. It is also to be borne in mind that compositions within the scope of the invention may comprise mixtures of calcium oxychlorid or other suitable oxysalt with magnesium oxychlorid, zinc oxychlorid, or the like, in varying proportions, and that the properties of such mixed compositions will necessarily vary to a greater or less extent depending upon the exact proportions of the different oxysalts present in the mixture.

The present invention is to be distinguished from prior proposals to hydrate burned lime by adding to the water used for hydration a small percentage of salts capable of forming oxysalts with the lime and magnesia present. Such a procedure is disclosed, for example, in the patent to Ellis, No. 783,570, where salts are added to the water used for hydration, such salts being more especially calcium chlorid, magnesium chlorid, or a mixture of the two. In such prior procedure, the percentage of salts added to the hydration water is so small, as is also the proportion of oxysalts formed, that the hydration mixture does not harden or set, the resultant product being a finely divided powder similar in all essential respects to ordinary lime hydrate, but possessing somewhat better spreading qualities when mixed up into plaster than does ordinary lime hydrate. In contrast to the procedure disclosed in the patent referred to, the percentage of salts employed in accordance with the present invention is at least sufficiently great to render the hydration mixture more or less hard and to produce a distinct setting of the mass, the immediate product of hydration lacking therefore the physical properties of "hydrated lime" or "hydrate." The extent of this setting and hardening varies with the proportion of metallic salt added. The set product is then reduced to finely divided condition, as by grinding, and the resultant material is, broadly speaking, an especially desirable form of the primary product contemplated by the present invention.

In a specific example, illustrating one way of preparing an oxychlorid composition within the invention 100 parts of a high calcium commercial ground quick-lime are mixed with 60 parts of commercial calcium chlorid (75% CaCl$_2$) and 50 parts of water, all parts being by weight. A convenient way of effecting this mixture is first to mix the calcium chlorid with the water, and then to treat the lime with the mixture. A vigorous reaction ensues, the mixture heating up quickly and setting into a hard but porous and more or less friable mass. The heat of combination drives off substantially all the excess water, and after the mass has stood for a day or two and has absorbed such water as is necessary for stable crystallization, it is then easily ground or otherwise reduced to a powder, preferably fine enough to pass 100 mesh, which is substantially dry and which may be kept for a long time in ordinary closed containers. The composition prepared as described is found in a typical instance to analyze approximately as follows:

| | |
|---|---|
| Lime (CaO) | 53.00% |
| Calcium chlorid | 31.90% |
| Magnesia (MgO), etc | 1.10% |
| Water | 14.00% |
| | 100.00% |

It is to be understood that in the foregoing analysis no attempt has been made to indicate the exact form in which the various constituents named may be present. Apparently they are present mainly in the form of a hydrated oxychlorid of calcium or a mixture of several hydrated oxychlorids of calcium and magnesium, accompanied by more or less hydrated lime and magnesia.

The proportions of the various ingredients employed may be varied within a wide range while still obtaining products within the scope of the invention. Another typical mixture yielding a thoroughly satisfactory product is 50 parts by weight of commercial calcium chlorid, and 50 parts by weight of high calcium commercial ground lime, with sufficient water to form a pasty mass. Such a mixture sets very rapidly to a hard porous mass and the heat of combination serves to substantially dry it out. It grinds readily without clogging the screens.

Another formula giving good results is 90 parts commercial quick-lime, 80 parts commercial calcium chlorid, and 36 parts of water (all parts by weight).

In all the foregoing examples, commercial grades of calcium chlorid and quick-lime have been specified. Pure compounds may of course be employed if desired, but for the purposes of this invention, the use of pure compounds is not essential to the formation of a valuable product. In fact the use of commercial materials is usually to be preferred for the reason that commercial calcium chlorid contains varying percentages of magnesium chlorid, while commercial lime, especially dolomitic limes, may be relatively high in magnesia. Under these conditions the final product of course contains more or less magnesium oxychlorid, and possibly double oxychlorids of lime and magnesium. These are not objectionable, but on the contrary are advantageous, especially where the calcium oxychlorid predominates, as is the case in the best embodiment of the invention.

In the second of the above two examples the proportion of calcium chlorid used is considerably greater than in the first case, but a satisfactory product results. In fact, so long as the amount of calcium chlorid does not much exceed that which can combine chemically with the lime and magnesia, the resultant product will stand storage well. In practice it is found that where the final product contains the equivalent of from about 25% to 35% CaCl$_2$, as indicated by an analysis of the type above given, the material is satisfactory, while a content of from about 25% to 30% CaCl$_2$ gives a material of particularly desirable character. These limits are not restrictive but are named only to indicate the best mode of practising the invention. For most purposes it is desirable that the composition shall contain the maximum percentage of calcium chlorid practicable, that is, such a maximum percentage as does not render the composition too damp or unstable to be handled and stored conveniently. The amount of calcium chlorid may however vary between such maximum percentage, where the commercial calcium chlorid approximately equals the amount of high grade commercial lime, and a minimum percentage which is just sufficient to give a distinct setting and hardening effect when the original ingredients are mixed, and which I have found to be when the calcium chlorid is about 2% of the quick-lime by weight.

It is possible to substitute hydrated lime for quick-lime in the procedure above described, but in such case it is necessary to use artificial heat to dry the reaction mass to the proper degree, whereas in using quick-lime, the heat of combination developed is sufficient to bring about the necessary drying. For this reason, among others, the use of hydrate in this connection is less economical and not so desirable. In a typical example, equal parts by weight of lime hydrate and calcium chlorid are employed, with enough water to give a pasty mixture, which is dried by artificial heat after setting, and is then ground to a powder as before.

The substantially dry powdered material finally obtained by either method keeps for a long time in ordinary closed containers, especially where the $CaCl_2$ content indicated by analysis does not materially exceed 30% to 35%, as previously stated; and it apparently remains in its original physical condition until all the excess hydrate of the combination has been changed to carbonate by absorption of carbon dioxid from the air. Further absorption of carbon dioxid causes decomposition of the oxychlorid, setting free calcium chlorid.

An oxysalt composition of the character hereinbefore described is useful for a number of purposes. Thus, a dry pulverulent material consisting wholly or in part of calcium oxychlorid, can be advantageously added in small proportions to Portland cement, or to mortars and concrete mixtures containing Portland cement. Cement mixtures thus modified are found to be much more plastic with the same percentage of water. There is no marked change in the setting time, as such is commonly determined, nor is there any substantial change on long time strength tests; but the early time strengths are considerably increased, and this is a highly important result. Moreover, the material is less injuriously affected by low temperature than cement mixtures of the usual kind. In practice, varying quantities of the oxysalt composition may be employed. In the case of a calcium oxychlorid composition, amounts equal to from 1% to 6% of the entire mixture may be used to replace an equal amount of Portland cement, and in practice as little as from 1% to 3%, has been found to give excellent results. Higher percentages, ranging even up to 9% to 10% for example, may be used, but ordinarily such large proportions are not necessary. Some Portland cements respond more fully than others, and this determines to some extent the percentage of the composition to be added, as does also the analysis of the composition itself. Its action in modifying the character of the cement mixture is not thoroughly understood, but it may perhaps function in some way as a catalytic or assistant in furthering and accelerating the reactions involved in the hardening process after the cement has received its set. At all events, the effect produced on the early time strengths is very marked and unmistakable. In this connection, it may be noted that it has been proposed heretofore to add calcium chlorid to cement and similar mixtures for the purpose of modifying the setting time and the early strength; but in addition to the disadvantages of the use of calcium chlorid direct, which are partly due to the fact that it is very deliquescent, there is also danger of adding the calcium chlorid in excess of the free lime present in the cement, thereby causing the cement to absorb moisture and to become caked. By adding pulverized oxychlorid, there is always enough lime or magnesia present to substantially saturate the calcium chlorid and thus to prevent any undesirable action by the latter. Furthermore, the effect produced on the early time strength of cement, cement mortar, cement concrete, etc., by the simultaneous addition of both "chlorid" and lime, or "chlorid" and "hydrate," whether as such or as a decomposable oxychlorid composition of the character hereinbefore described, is in excess of and different from what would be expected as the mean of the action of the two materials used separately. For instance, the addition of hydrate to standard Portland cement whose set has been regulated by the addition of gypsum, tends to slow the set and rather reduces the early time strength. The addition of calcium chlorid alone quickens the set slightly and increases the early time strength. But the addition of chlorid and lime, or chlorid and hydrate, with the lime or hydrate present in amount at least sufficient to form an oxychlorid compound, or the addition of such oxychlorid compound directly, results in little change in the setting time, and a greater increase in the short time strengths than results from using the corresponding amount of chlorid alone. A possible explanation of this behavior is that in such a mixture, oxychlorid is continually being formed and decomposed, with the chlorid on that account acting more energetically as regards quick "short-time" hardening after set; and that ultimately, as the material dries and the hydration is completed, the chlorid finally reacts in some way with the lime to form a relatively stable combination, thus differing from a cement of concrete mixture in which calcium chlorid alone is added without a sufficient amount of free lime present to form such combination. It is also to be noted that cement, cement concrete, or cement mortar, to which calcium oxychlorid has been added exhibits a considerably higher degree of plasticity than do said materials when untreated.

In carrying out this part of the invention practically, various procedures may be followed. For example, to cement, sand, and broken stone, in the proportions usual for cement concrete, may be added an oxysalt compound of the character described, specifically a calcium oxychlorid compound, in the form of a fine powder in such amount that the available salt (calcium chlorid)

present shall equal two and one-half per cent. of the cement by weight. The materials are mixed together in the usual way, and water is then added and mixed in the customary manner. Or the oxychlorid, as a dry powder, may be mixed with the cement separately in the proper proportion; or "hydrate" may first be mixed with the cement and the aggregate, and then the "chlorid" in solution amounting to about two and one-half per cent. of the cement used may be added. This percentage is found to give particularly good results, but the invention is not to be understood as limited to the use of any specific proportion of the oxysalt in this connection. Obviously also other specific procedures may be adopted within the scope of the invention.

Similarly the oxysalt composition of the invention may be added to a lime mortar, or plaster, whether made with hydrated lime or lime paste, to give a resultant material which possesses greater plasticity, has its lime content more perfectly hydrated, hardens more rapidly, and ultimately becomes harder or tougher, than ordinary lime plaster. Thus, in preparing such lime mortar or plaster in accordance with this invention, the lime is slaked in the presence of a small percentage of the novel oxychlorid or other oxysalt composition, which may be mixed therewith in any convenient manner, the percentage employed ordinarily ranging in practice from 1½% to 5% by weight of the lime. Under these conditions, the lime is found to slake much more thoroughly and completely, with the result that plaster made in this way does not blister or check after application.

I have also found that the addition of a small percentage of calcium chlorid to lime hydrates which are largely magnesian, gives a product which, when mixed with water in the proper proportions, gives a plaster or mortar which sets very hard and tough and which ultimately is quite resistant to water. Commercial hydrates derived from western sources are typical of the hydrates here in question since they are usually prepared from dolomitic lime. By mixing with such a dry hydrate powder an amount of calcium oxychlorid representing say about 1% available $CaCl_2$, on the weight of the hydrate, the whole mixture can be kept as a dry powder ready for addition of water at any time to make plaster or mortar. By the term "hydrate" is understood a product obtained by slaking burned lime with a limited amount of water to obtain hydrated lime in the form of an exceedingly finely divided fluffy powder.

What I claim is:

1. As a new article of manufacture, a pulverulent material comprising principally a set oxysalt cement compound of a base, said material yielding, upon treatment with water, the corresponding simple salt and a hydrate of said base.

2. As a new article of manufacture, a substantially dry pulverulent material comprising principally a set and hydrated oxysalt composition.

3. As a new article of manufacture, a pulverulent material comprising principally a set oxyhalid cement compound of a base, said material yielding, upon treatment with water, the corresponding halid and a hydrate of the base.

4. As a new article of manufacture, a pulverulent material comprising principally a set oxychlorid cement compound of an inorganic base, said material yielding, upon treatment with water, a chlorid and a hydrate of said base.

5. As a new article of manufacture, a substantially dry pulverulent material consisting principally of a set and hydrated oxychlorid compound of an earth metal.

6. As a new article of manufacture, a substantially dry pulverulent material consisting principally of a set oxychlorid compound of calcium.

7. As a new article of manufacture, a substantially dry pulverulent material comprising set oxychlorid compounds of calcium and magnesium.

8. As a new article of manufacture, a substantially dry pulverulent material comprising set oxychlorid compounds of calcium and magnesium, calcium oxychlorid being present in predominating proportion.

9. The process of producing useful oxysalt compositions of the character described, which comprises mixing an oxid and a salt under suitable reacting conditions to form an oxysalt cement, allowing said cement to set and to become relatively dry but not dehydrating the same, and then reducing the set cement to finely divided condition.

10. The process of producing useful oxyhalid compositions of the character described, which comprises mixing an oxid and a halid in the presence of moisture and under suitable reacting conditions to form an oxyhalid cement, allowing said cement to set and to become relatively dry, but not dehydrating the same, and then reducing the set cement to finely divided condition.

11. The process of producing useful oxychlorid compositions of the character described, which comprises reacting between an earth metal oxid, and an earth metal chlorid in the presence of moisture to form an oxychlorid cement composition, allowing said cement composition to set, and pulverizing the resultant material, still containing water of hydration.

12. The process of preparing useful oxychlorid compositions which comprises reacting between lime and calcium chlorid in the presence of moisture, allowing the resultant oxychlorid cement composition to set and to become relatively dry by the heat of hydration, and then pulverizing the set composition.

13. The process of preparing useful oxychlorid compositions which comprises reacting between lime and calcium chlorid in the presence of moisture and in proper proportions to insure chemical combination of substantially all the calcium chlorid, allowing the resultant oxychlorid cement composition to set, and pulverizing the set composition still containing water of hydration.

14. The process of producing useful oxychlorid compositions which comprises reacting between commercial quick-lime and commercial calcium chlorid in the presence of moisture to form a set plastic mass, and reducing the set mass still containing water of hydration to pulverulent condition.

15. As a new article of manufacture, a relatively stable dry pulverulent material analyzing upward of 2% by weight of calcium chlorid combined as calcium oxychlorid, substantially as described.

16. As a new article of manufacture, a relatively dry pulverulent material containing upward of 2 per cent. by weight of available calcium chlorid, said material being substantially stable under ordinary conditions of exposure to atmosphere.

17. As a new article of manufacture, a relatively dry pulverulent material containing upward of 20 per cent. by weight of available calcium chlorid, said material being substantially stable under ordinary conditions of exposure to atmosphere.

18. As a new article of manufacture, a relatively dry pulverulent material containing from about 25 to 35 per cent. by weight of available calcium chlorid, said material being substantially stable under ordinary conditions of exposure to atmosphere.

19. As a new article of manufacture, a relatively dry pulverulent material comprising a magnesian lime hydrate and an oxychlorid of calcium mixed therewith.

20. As a new article of manufacture, a relatively dry pulverulent material comprising a magnesian lime hydrate with which has been admixed an amount of an oxychlorid of calcium equivalent to about 1% $CaCl_2$ on the weight of the hydrate.

In testimony whereof I hereunto affix my signature.

CHARLES CATLETT.